United States Patent [19]

Sakamoto et al.

[11] 3,750,926

[45] Aug. 7, 1973

[54] VIBRATION ELEMENT FOR SUPERSONIC BONDING

[75] Inventors: Yuzaburo Sakamoto, Musashimurayama; Hiroshi Nishizuka; Kakutaro Kawai, both of Tokyo, all of Japan

[73] Assignee: Hitachi, Ltd., Chuyoda-ku, Tokyo, Japan

[22] Filed: Mar. 2, 1971

[21] Appl. No.: 120,288

[52] U.S. Cl. .................... 228/1, 29/470.1, 29/471.1, 29/576, 228/6

[51] Int. Cl. .................... B23k 1/06

[58] Field of Search .................... 29/470, 470.1, 471.1, 29/576; 228/1, 3, 6.5, 6; 156/73

[56] References Cited

UNITED STATES PATENTS

| | | | |
|---|---|---|---|
| 3,047,942 | 8/1962 | Schneider et al. | 29/470 |
| 3,052,020 | 9/1962 | Jones et al. | 29/470.1 |
| 3,426,951 | 2/1969 | Pohlman et al. | 228/1 |
| 3,468,731 | 9/1969 | Obeda | 228/1 X |

*Primary Examiner*—J. Spencer Overholser
*Assistant Examiner*—Robert J. Craig
*Attorney*—Craig, Antonelli, Stewart & Hill

[57] ABSTRACT

A vibration element used for the apparatus for supersonically bonding a semiconductor chip on the back surface of which a relatively soft metal layer is formed, wherein thin grooves are disposed linearly or curvedly at suitable intervals in the surface of the vibration element so that the surface of the element has a sufficiently large vibration communicating area.

1 Claim, 12 Drawing Figures

INVENTORS
YUZABURO SAKAMOTO
HIROSHI NISHIZUKA
KAKUTARO KAWAI
BY

Craig, Antonelli, Stewart & Hill
ATTORNEYS

INVENTORS
YUZABURO SAKAMOTO
HIROSHI NISHIZUKA
KAKUTARO KAWAI

BY

Craig, Antonelli, Stewart & Hill
ATTORNEYS

VIBRATION ELEMENT FOR SUPERSONIC BONDING

This invention relates to improved vibration elements for a supersonic bonding apparatus used for assembling semiconductor devices.

In the case of manufacturing semiconductor devices having many terminals, such as integrated circuit devices, the connection of leads to the corresponding electrode terminals of a semiconductor chip comprising various circuit elements has been widely done in such manner that a continuous strip having a lead pattern of aluminum foil in which a plurality of leads are formed in a radial form is used, the semiconductor chip in which circuit elements are formed is superposed thereon, and the electrodes are connected to the corresponding leads under the pressure of supersonic vibration.

More specifically, as shown in FIG. 1, a semiconductor chip 3 is set on the end of a vibration element 4 having a vacuum hole 5, the semiconductor chip is superposed on an aluminum foil lead pattern 2 placed on a support table 1 so that the terminals of the chip are coincident with the lead pattern, the end of the vibration element is pressed to the upper center part of the semiconductor chip and, while doing this, supersonic vibration is applied thereto, to produce a frictional heat between the terminals of the semiconductor chip and the lead pattern whereby the terminals and leads are bonded together. According to this method, it is essential to concentrate the vibration energy upon the area between the terminals of the semiconductor chip 3 and the lead pattern 2 in order to realize steady bonding between the terminals and leads. In this process, the lead pattern, the end of the vibration element and the semiconductor chip are to be immovably set in position. For this purpose, it is first important to hold firm the end of the vibration element to the semiconductor chip. It is relatively easy to set the lead pattern so that it is immovable.

In view of the function as described above, the supersonic bonding apparatus is classified roughly into two types. One wherein bonding is based on the difference in the coefficient of friction between the terminal of the semiconductor chip and the lead pattern and between the semiconductor chip and the end of the vibration element. The other, wherein bonding is done by thrusting the tip end of the vibration element into the semiconductor chip to a suitable depth.

In the former, the bonding strength obtainable is not enough since the bonding strength is dependent upon the difference in the friction coefficient. While in the latter, sufficient bonding strength can be obtained because the end of the vibration element is thrust into the semiconductor chip. This method is called dimensional bonding. The present invention is particularly directed to the dimensional bond.

FIG. 2 shows an example of a vibration element used for the dimensional bonding apparatus. As illustrated therein, the end of the vibration element is made thinner toward its edge. The bonding apparatus having such a vibration element has drawbacks; for example, the semiconductor chip tends to crack due to the form of the circumference portion of the semiconductor chip, which has been separated from the wafer structure FIG. 3(*a*) shows another example of a dimensional bonding apparatus having a cone-shaped vibration element, the end of which is provided with a suction hole 5 for holding the semiconductor chip. In this supersonic bonding apparatus, the mechanical coupling force between the end of the vibration element and the back surface of the semiconductor chip is not enough in the initial stage of the bonding process. As a result, the position of the semiconductor chip tends to deviate, and it is often the case that the terminals fail in establishing contact with the lead pattern or come in contact with the lead pattern, but at a small area. To avoid this, an improved supersonic bonding has been proposed. According to this proposal, a metal layer made of much softer metal than that of the vibration element is formed on the back surface of the semiconductor chip. More specifically, as shown in FIG. 3(*b*), the vibration element is pressed to the metal layer 7, to thrust its end into the metal layer 7 whereby a metallic barrier wall is formed against the lateral movement of the vibration element. Thus, the end of the vibration element is perfectly stopped by the metal layer 7 and the vacuum adsorption force is increased, to hold the semiconductor chip from moving off the position.

In this method, however, the end of the vibration element easily wears or may be damaged because the end surface of the vibration element is in contact with the semiconductor chip in the case where the shape of the vibration element is made thinner toward the end of the element. In other words, according to this method, the number of effective bonding processes which can be achieved by one element is reduced and the bonding strength is markedly lowered with increase in the number of bonding operation. To eliminate the above drawbacks, a vibration element having a groove whose cross-section is of saw-tooth shape has been proposed. According to this prior art proposal, the soft metal layer formed on the back surface of the semiconductor chip tends to adhere to the inner wall of the groove (so-called build-up phenomenon) with increase in the number of bonding processes because the shape of the groove is improper. In this method, therefore, it is hardly possible to obtain sufficient bonding strength and a desirable number of bonding processes.

In view of the foregoing, a general object of this invention is to provide a vibration element for a supersonic bonding apparatus in which the drawbacks inherent in the prior art are eliminated and thus highly desirable bonding is realized in the production of semiconductor devices.

With the above-mentioned object in view, a vibration element of this invention is characterized in that linear or curved thin grooves are disposed at suitable intervals in the end surface of the vibration element so that the surface to which supersonic vibration is applied has a sufficiently large area, to prevent the end portion of the element from being worn due to friction and to increase the bonding strength and the number of bonding operations which can be performed.

The invention will be better understood from the following description taken in connection with the accompanying drawings, in which.

Figure 1:
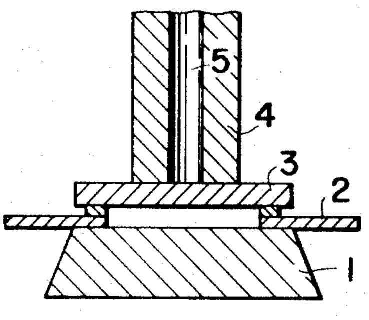
FIG. 1 is a sectional view illustrating the principle of supersonic bonding.
Figure 2:
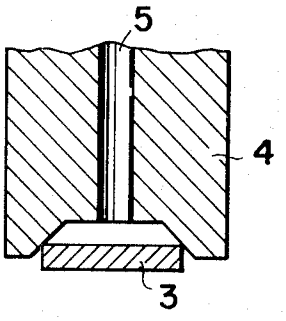
FIG. 2 is a sectional view illustrating a conventional vibration element for supersonic bonding.
Figure 3A:
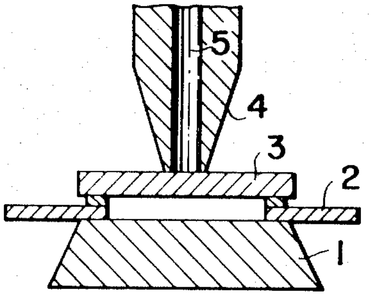
Figure 3B:
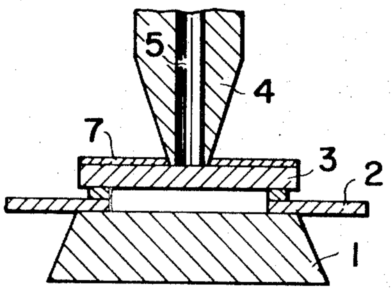
Figure 4:
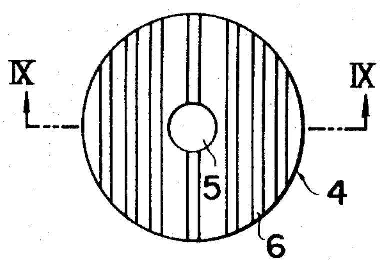
Figure 9:
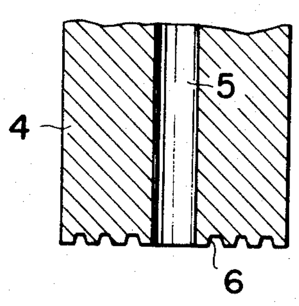
Figure 10:
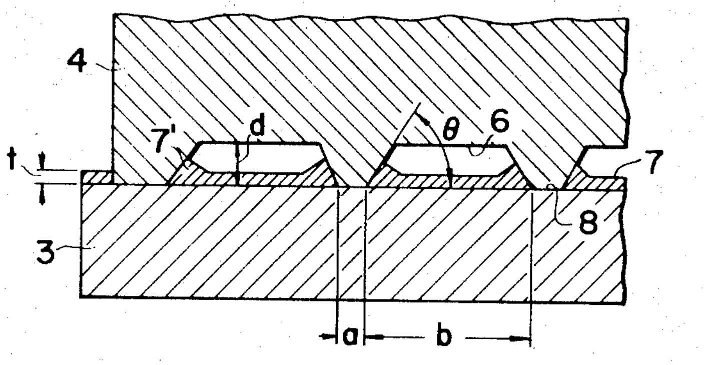
Figure 11:
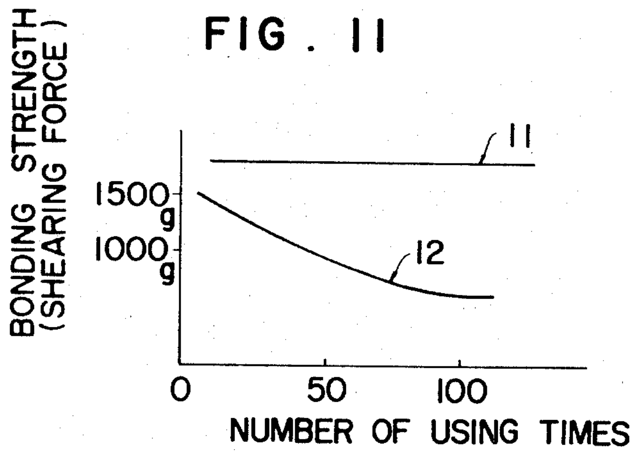

FIGS. 3(*a*) and 3(*b*) are sectional views illustrating the structural and functional features of another vibration element for supersonic bonding according to the prior art;

FIGS. 4 to 8 are plan views each illustrating the surface form of a vibration element;

FIG. 9 is a sectional view of the vibration element taken along line IX—IX in FIG. 4;

FIG. 10 is an enlarged sectional view of the vibration element of FIG. 9; and FIG. 11 is a graph showing the effect of this invention as compared with the prior art.

Referring to FIGS. 4 through 8, there are shown various end surface shapes of vibration elements embodying this invention. FIG. 4 shows a vibration element 4 in which an adsorption hole 5 is provided and parallel thin grooves 6 are disposed at specific intervals on one end surface of the element. The outer diameter of the vibration element 4 is about 2.0 mm. and the inner diameter of the adsorption hole 5 is about 0.5 mm. FIG. 9 is a sectional view of the vibration element taken along the line IX—IX of FIG. 4, and FIG. 10 is an enlarged sectional view showing the structural and functional features of the element as seen in FIG. 9, wherein an aluminum layer is formed on the back surface of the semiconductor chip, and the vibration element is pressed to this aluminum layer. In the drawings, identical components are indicated by the same reference numerals.

In FIG. 10, the reference 7 denotes a layer of soft metal such as aluminum, gold or solder, formed on the back surface of a semiconductor chip 3. In this embodiment aluminum is used. The thickness $t$ of the aluminum layer is about 5 to 7 microns. The numeral 8 denotes surfaces to which a supersonic vibration is transmitted from the end of the vibration element. Surface 8 will hereinafter be referred to as a vibration transmission surface. The surfaces 8 are formed flat, and each has a width of about 30 microns. The numeral 6 denotes thin grooves, each having a width $b$ of about 250 microns and a depth $d$ of about 20 microns. The angle $\theta$ formed between the horizontal plane and the side wall of the thin groove is determined to be more than 60°. The angle $\theta$ will hereinafter be referred to as a relief angle.

In the structure as described above, the thin grooves 6 of the vibration element engage with the aluminum layer 7, and the pressure applicable to the vibration element is equal to or more than the allowable stress of the aluminum layer. Therefore, the end of the element is thoroughly coupled with the aluminum layer and thus, the necessary bonding strength can be obtained. Since the vibration transmission surface of the end surface of the vibration element is flat, the tip end surface of the vibration element is at most slightly thrust into the semiconductor chip. This serves to effectively prevent abrasion of the end of the vibration element and to eliminate strain caused in the semiconductor chip. Also, the semiconductor chip is protected against cracking which has therefore been often brought about in the prior art.

In this type of vibration element, the shape of the thin groove 6 must be carefully determined because a raised aluminum portion 7, the so-called build-up portion, is formed on the side wall of the thin groove 6 when the vibration element is pressed to the aluminum layer 7. This build-up serves to lower the bonding strength. To avoid this, the depth of the thin groove 6 must be suitably deep. For example, in this embodiment, the depth of the groove is determined to be about 20 microns when the thickness of the aluminum layer 7 is 7 microns. Namely, the depth of the groove 6 is more than 1.5 times the thickness of the aluminum layer. Thus, since the groove 6 has a depth which is more than the height of the portion raised by piling up the soft metal, which is deposited on the back surface of the semiconductor chip and is then removed during the bonding step, on the side wall of the groove is formed the problem that the bonding strength is lowered due to the deposit of soft metal on the side wall of the groove 6 can be solved.

In order to obtain sufficient bonding strength, it is important to determine a suitable range for the depth $d$ of the thin groove and the relief angle $\theta$. It was experimentally found that a desirable bonding strength can be obtained when $\theta$ is more than 60°.

When the intervals between the thin grooves are too small, it becomes difficult to make such grooves. While too large intervals may result in a non-uniform bonding strength. It is to be also noted that when the width of the flat portion of the end of the vibration element is too small, the vibration element may be thrust into the semiconductor chip; while, too large a width results in insufficient bonding strength. Therefore, both the width of the thin groove and the width of the flat portion must be adequate. For example, it is desirable that the width of the thin groove be about 250 microns, and the width of the flat portion be about 30 microns.

In the above embodiment, it was found that a good bonding result can be obtained when the area of the vibration element in contact with the semiconductor chip is less than 30 percent of the area of the tip end of the vibration element.

It is possible to consider that aluminum adheres to the vibration transmission surface of the end of the vibration element due to the foregoing build-up effect. However, even if there is such aluminum adhesion, it easily comes off because the pressure applied to the vibration transmission surface becomes more than the allowable stress of aluminum and the vibration transmission surface is thrust into the aluminum layer and rubs against the semiconductor chip. By this "self-cleaning effect," no aluminum stays therein, and normal bonding can be maintained at all times.

As described above, the bonding effect is increased by disposing thin grooves in the tip end surface of the vibration element. FIG. 11 shows the relationship between the bonding strength measured in terms of shearing force and the number of times of use of the vibration element. In FIG. 11, numeral 12 indicates the result of a test on the vibration element shown in FIG. 3(b), and numeral 11 indicates the result thereof according to this invention. It is obvious from the results that the bonding strength of the element according to this invention is not lowered by the number of times of use of the element.

More specifically, the vibration element was tested under the condition that the bonding strength maintained was more than 1,200 g in terms of shearing force. As indicated by the curve 12, the bonding strength is lowered below a certain standard value when 30 to 40 pieces of semiconductor chips are treated. In other words, the vibration element must be frequently replaced in the prior art. Whereas, according to this invention, bonding can be accomplished with a constant bonding strength. In this respect, too, the vibration element of this invention is incomparable to that of the prior art.

It was also found in the vibration element of this invention that the abrasion at the tip end of the element is minimized and no cracking is brought about in the semiconductor chip because the area of the vibration transmission surface of the end of the element is wide enough.

Figure 5:
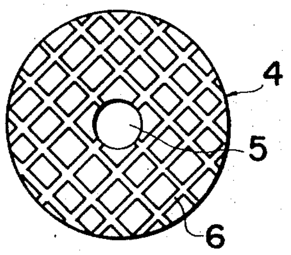
Figure 6:
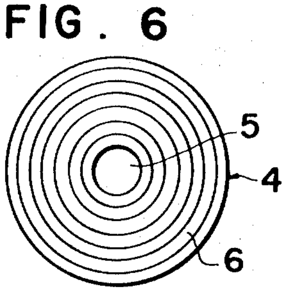
Figure 7:
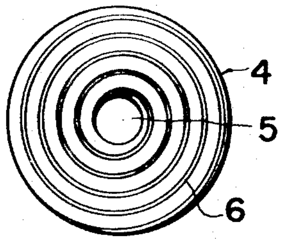
Figure 8:
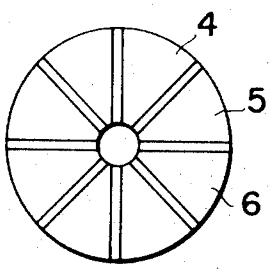

The flat portion 8 may be formed so that its edges area on the side of the thin groove is more or less arc-shaped. With such a vibration element also, the foregoing bonding effect can be obtained. FIGS. 5 through 8 show other embodiments of this invention. FIG. 5 shows an arrangement wherein parallel thin grooves are disposed so as to be mutually perpendicular in a lattice form. FIG. 6 shows a vibration element in which thin grooves 6 are disposed in a pattern of concentric circles so as to surround an adsorption hole 5 as a center. FIG. 7 is another arrangement wherein the groove is disposed in a spiral form. FIG. 8 is an example wherein the grooves are disposed radially centering at an adsorption hole 5.

The thin grooves as in FIGS. 4 through 8 can be formed by mechanical work using a profile grinder or the like in the case where the grooves are linear. The curved grooves can be formed by electrical discharge machining.

A super hard alloy, such as tungsten carbide, which has high abrasion resistance, good workability and high processing accuracy, is used for the base material of the vibration element. Titanium carbide or stainless steel may also be used.

The vibration element of this invention has various beneficial features besides what have been described above. For example, the invention removes the problem of lowering the reliability due to the residual stress produced in the semiconductor chip by its deformation during bonding process using such vibration element as having a taper end as in FIG. 3.

While we have shown and described several embodiments in accordance with the present invention, it is understood that the same is not limited thereto, but is susceptible of numerous changes and modifications as known to a person skilled in the art, and we therefore do not wish to be limited to the details shown and described herein, but intend to cover all such changes and modifications as are obvious to one or ordinary skill in the art.

What is claimed is:

1. A vibration tip element for an apparatus for supersonically bonding a semiconductor chip to a lead element, wherein said vibration tip element is connected to a source of vibration energy, said vibration tip element including a plurality of grooves disposed at predetermined intervals in a surface thereof so that the surface thereof has a significantly large vibration communicating area, wherein the relief angle at each said groove is determined to be more than 60°, wherein said plurality of grooves form a spiral, and wherein said vibration communicating area of said vibration tip element is less than 30 percent of the total surface area including said plurality of grooves.

* * * * *